(No Model.)  7 Sheets—Sheet 2.

J. W. NADELHOFFER.
MACHINE FOR MAKING BARBED WIRE.

No. 281,120. Patented July 10, 1883.

Witnesses.
Thos. H. Hutchins
Wm. J. Hutchins

Inventor.
John W. Nadelhoffer (No Model.)

J. W. NADELHOFFER.
MACHINE FOR MAKING BARBED WIRE.

No. 281,120. Patented July 10, 1883.

Witnesses.
Thos. J. Hutchins
Wm. J. Hutchins

Inventor.
John W. Nadelhoffer

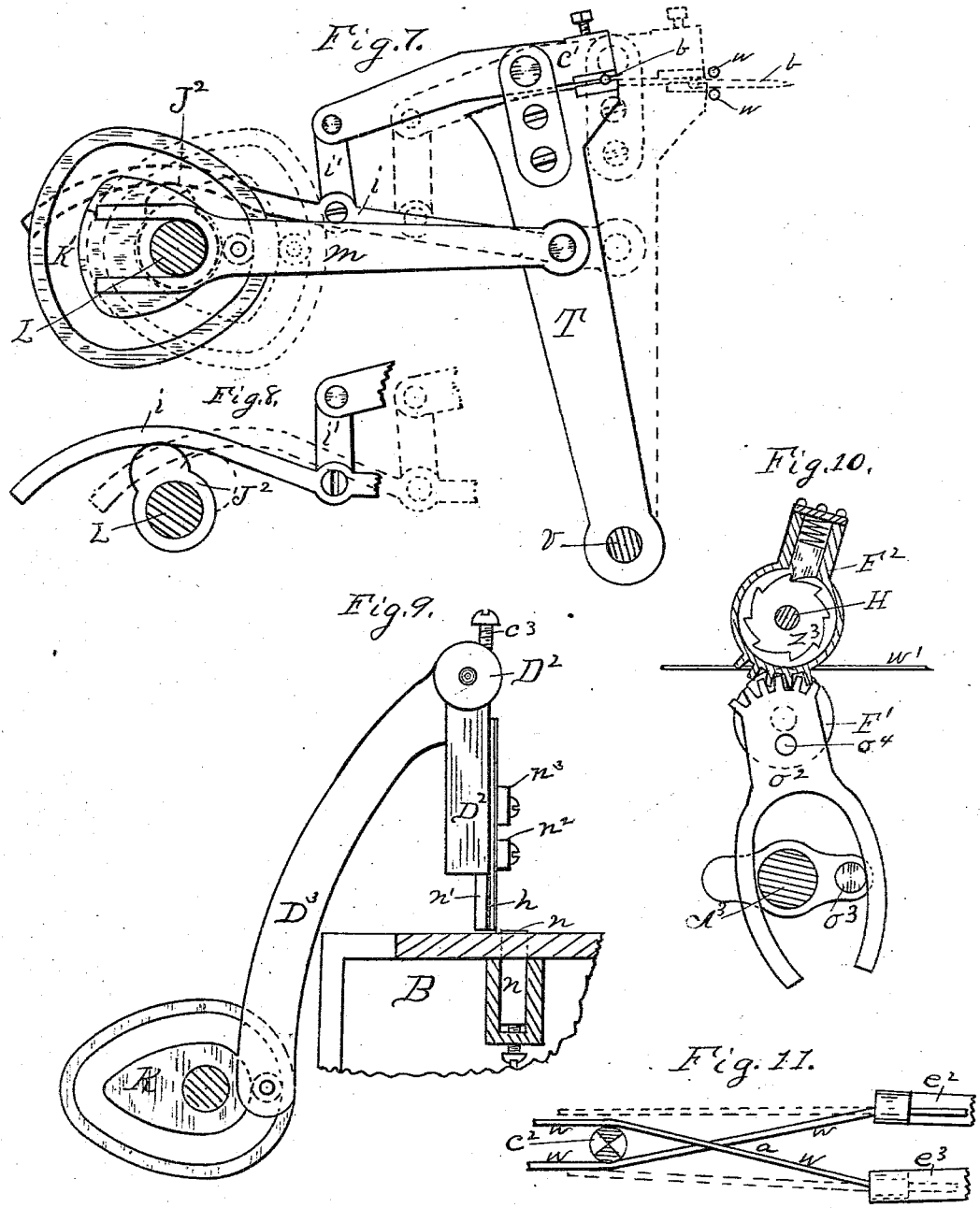

(No Model.)  7 Sheets—Sheet 6.
J. W. NADELHOFFER.
MACHINE FOR MAKING BARBED WIRE.
No. 281,120. Patented July 10, 1883.
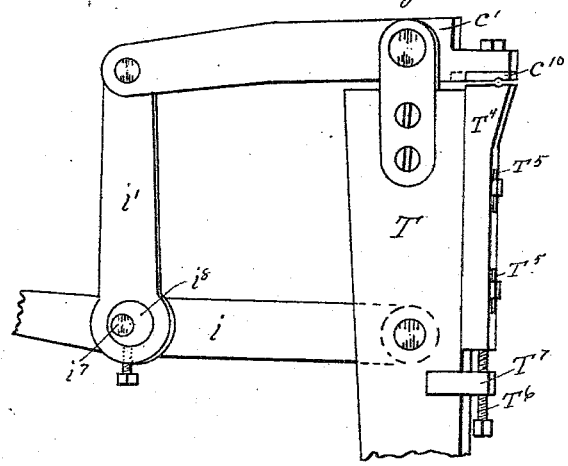
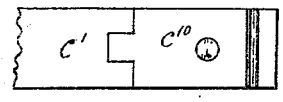
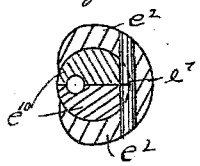

(No Model.)  J. W. NADELHOFFER.  7 Sheets—Sheet 7.
MACHINE FOR MAKING BARBED WIRE.
No. 281,120.  Patented July 10, 1883.

United States Patent Office.

JOHN W. NADELHOFFER, OF JOLIET, ILLINOIS, ASSIGNOR TO ANDREW DILLMAN AND EDWARD R. KNOWLTON, OF SAME PLACE.

MACHINE FOR MAKING BARBED WIRE.

SPECIFICATION forming part of Letters Patent No. 281,120, dated July 10, 1883.

Application filed February 27, 1883. (No model.)

*To all whom it may concern:*

Be it known that I, JOHN W. NADELHOFFER, of the city of Joliet, in Will county, and State of Illinois, have invented certain new and useful Improvements in Machines for Making Barbed Wire, the construction and operation of which I will proceed to explain, reference being had to the annexed drawings, in which—

Figure 1:
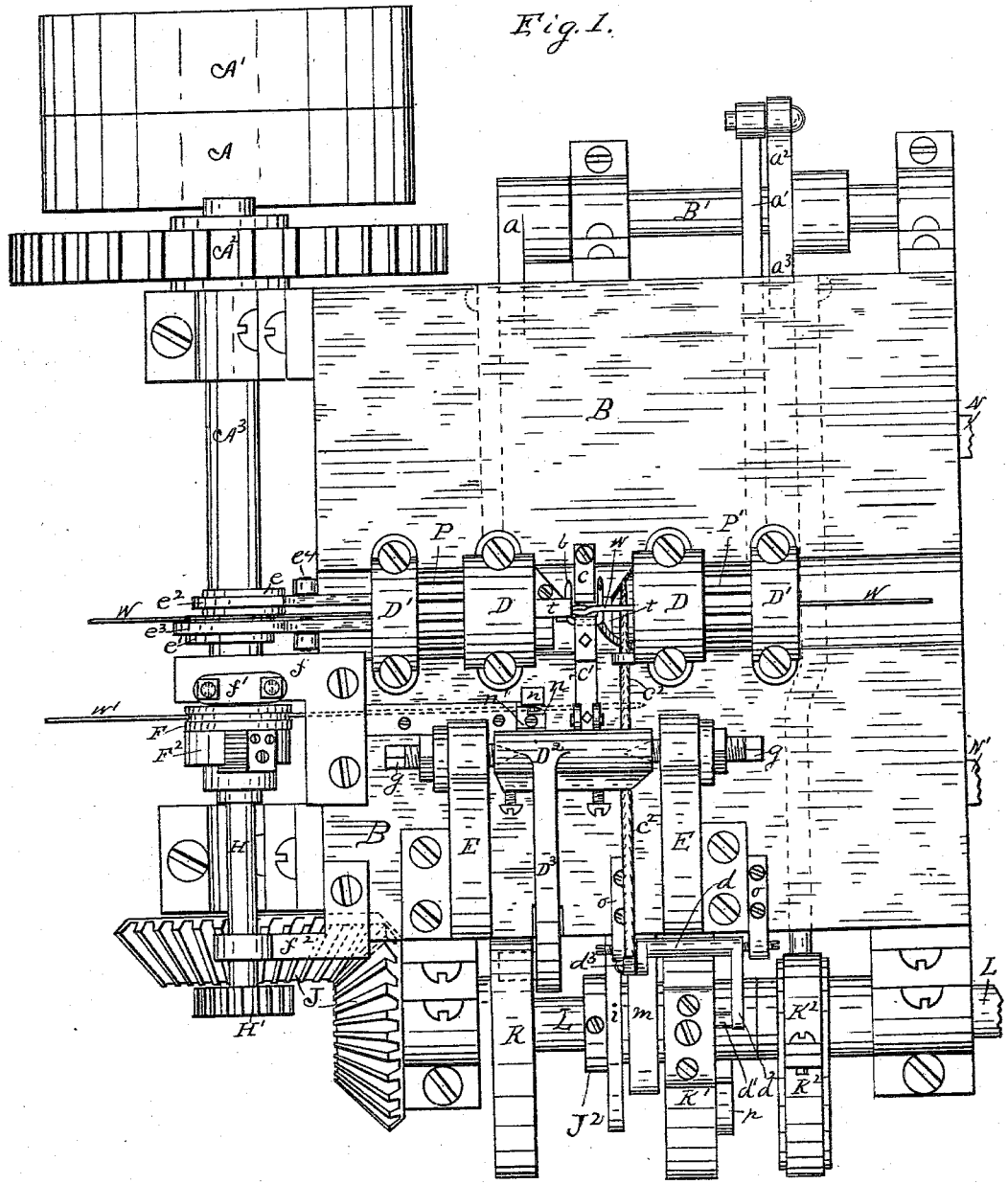
Figure 2:
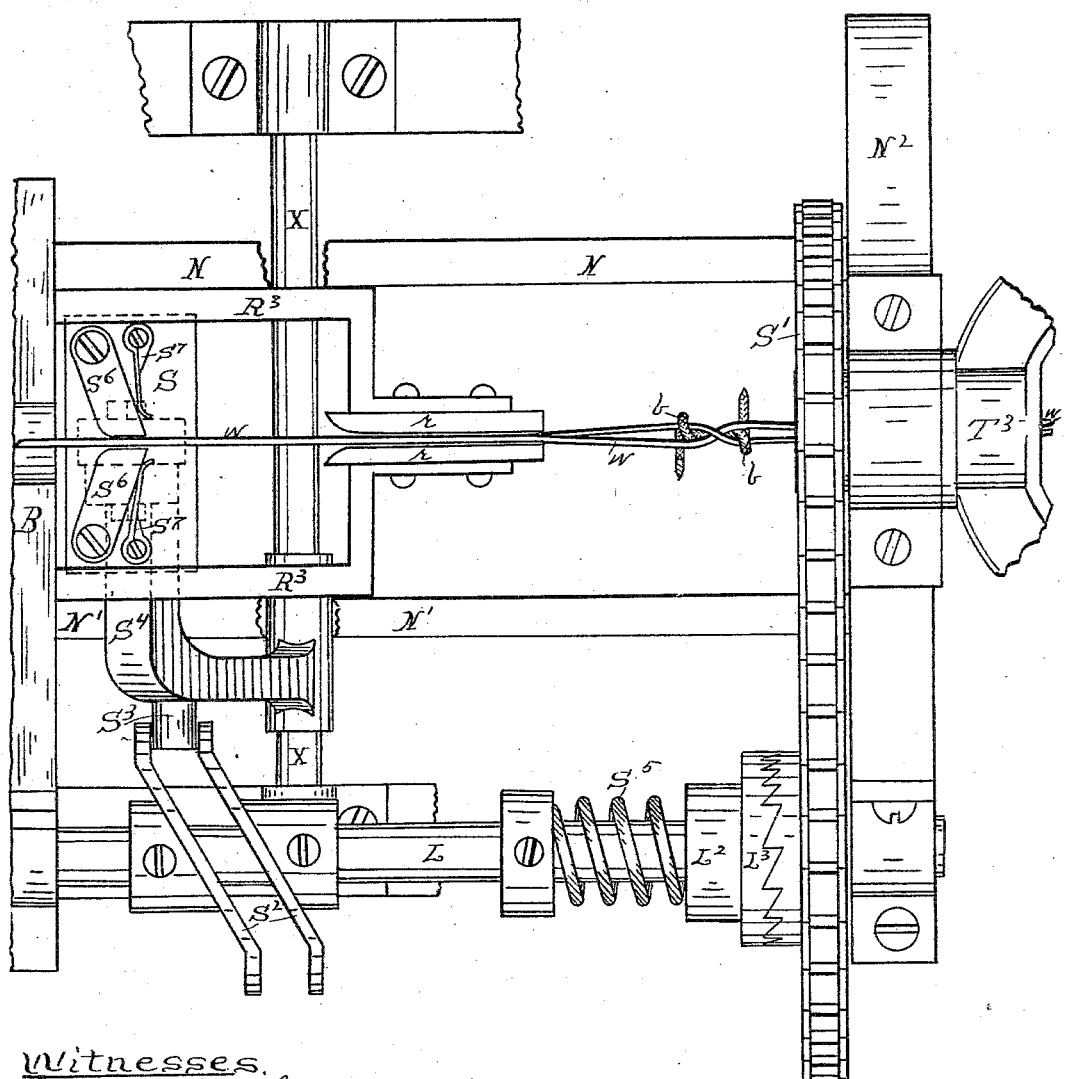
Figure 3:
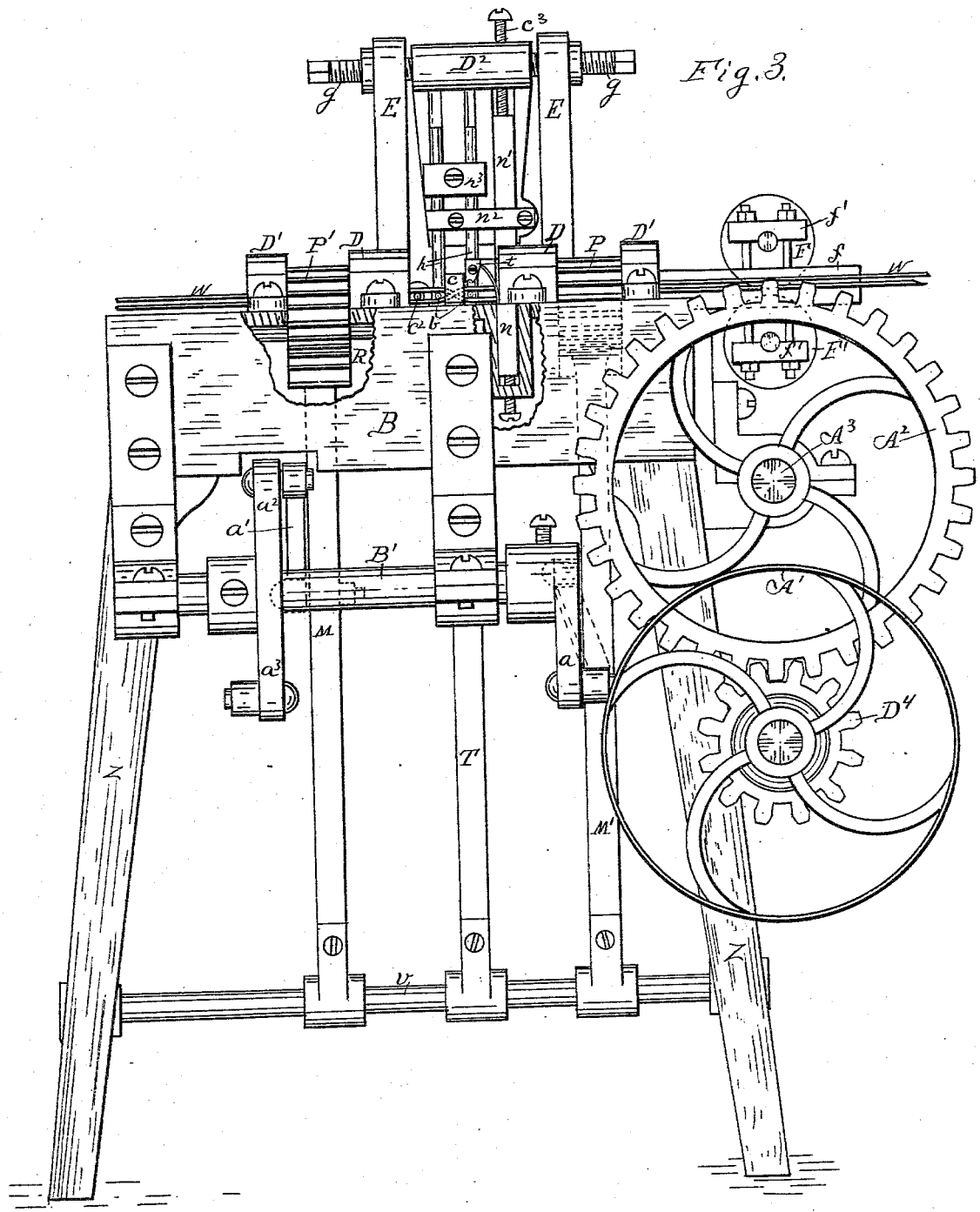
Figure 4:
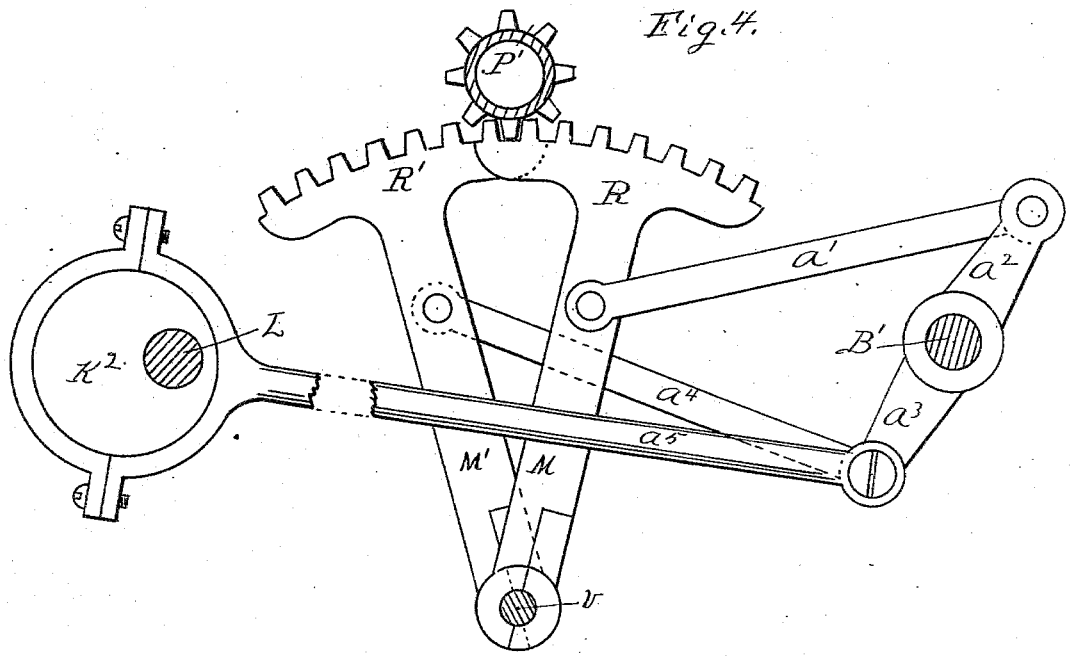
Figure 5:
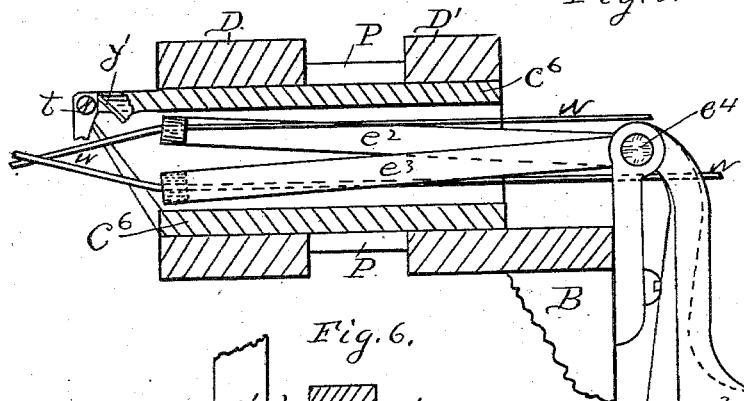
Figure 6:
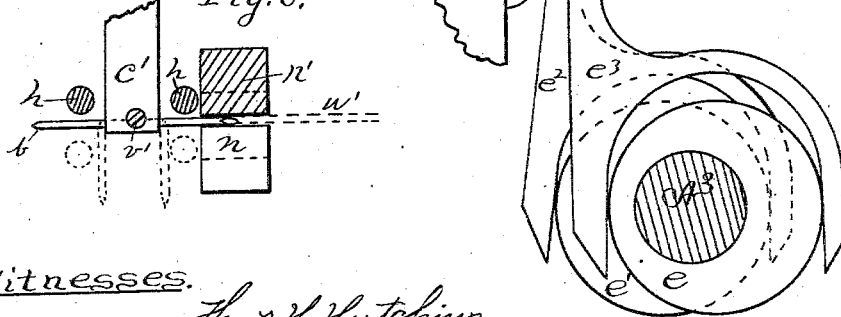
Figure 15:
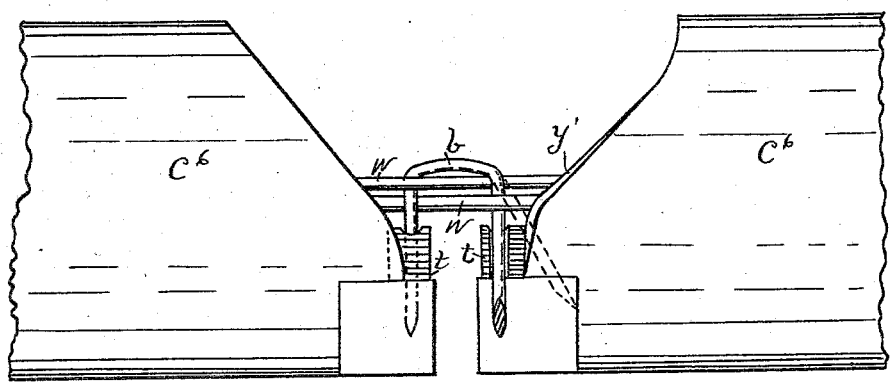

Figures 1 and 2 are plan views on the top; Fig. 3, a side elevation, looking at Fig. 1 from the upper end; Fig. 4, a side view of the reciprocating racks that rotate the wrapping-pinions; Fig. 5, a vertical section of the wrapping-pinion containing the strand-wire crossers; Fig. 6, a view on the top of the barb-grasper, and a cross-section of the cutting-off die and the barb-bending posts; Fig. 7, a side view of the barb grasper and feed; Fig. 8, a side view of a portion of the same; Fig. 9, a side view of the cutting-off dies, bending-posts, and frame bearing the same; Fig. 10, a side view of the barb-wire feed; Fig. 11, a side view of the strand-wire crossers $e^2$ and $e^3$, showing the position of the finger $e^2$ at the time the strand-wires are being crossed; Fig. 12, a perspective view of the barb grasper and feed; Fig. 13, a plan view on the bottom of the upper die, $e^{10}$, of the barb-grasper; and Fig. 14, a cross-sectional view of the eye on the end of one of the fingers, $e^2$, showing the removable friction-plates $e^{16}$, through which the strand-wire passes; Fig. 15, an enlarged side view of the wrapping-pinions, showing the gatherers $y'$, and the manner in which they deliver the prongs of the barb into the notch of the wrappers.

This invention relates to certain improvements in machines for forming the barb of a short piece of wire and placing it on the two strand-wires, all at a single operation, and is of that class of machines that receives the plain wire, both for the strand-wires and for the wire of which the barbs are to be formed, off of suitable spools located near the machine, and automatically forms and places the barb on the strand-wires, and delivers it finished for fence purposes, and in this instance forms what is known as a "double-strand two-pointed barbed wire."

The new features in this invention consist, more particularly, in the mechanism for forming the barb and delivering it into the strand-wires; in the mechanism for crossing or plaiting the strand-wires, one over the other, without twisting together; the wrapping and gathering device, and the take-up of the strand-wires after they have been barbed, so that this specification will refer more particularly to those features.

The product or barb formed and placed on the strand-wires by this machine is shown in Fig. 2, where the finished barbed strand-wires are ready to be spooled for use.

Referring to the drawings making a part of this specification, B represents a bed-plate supported on suitable legs, $z$. At one side of and attached to said bed-plate B is the main drive-shaft $A^3$, having at its outer end the main drive cog-wheel $A^2$, to which the power is applied by means of pinion $D^4$, while its outer end is provided with the bevel-gear J to run the counter-shaft L, from which counter-shaft the working parts of the machine receive their motion by means of the cams K, K', $K^2$, and $J^2$.

P and P' are the two barb-wrapping pinions through which the strand-wires W W enter the machine, as shown in Fig. 1, and between which the barb $b$ is wrapped on said strand-wires. Said wrapping-pinions are hollow, and of sufficient diameter within to admit of the crossing of the strand-wires within one of the pinions, as shown in Figs. 5 and 11. A pair of fingers, $e^2$ and $e^3$, (shown particularly in Fig. 5,) enter within the wrapping-pinion P, and are provided at their extreme outer ends with eyes through which the strand-wires W W pass on their way into the machine. These fingers $e^2$ and $e^3$ are pivoted together, on the same pivot, $e^4$, to the frame B, just outside of the pinion P, and extend thence downward, in the form of a bell-crank and crotch, over the double cam $e$ and $e'$ on the shaft $A^3$, which double cam gives an opposite motion to the fingers $e^2$ and $e^3$, as shown in Figs. 5 and 11, alternately, by means of which the two strand-wires are carried past and crossed one over the other, back and forth between the wrapping-pinions, just at the point the barb is to be placed on, as shown, and more particularly hereinafter set forth.

The wire W', from which the barb $b$ is formed, enters the machine on a line parallel with the strand-wires W W, by means of a feed, (shown in Figs. 1, 3, and 10,) and consists of the feed-rollers F F', shaft H, and a similar shaft to which is attached the roller F', pinion H, which meshes with a similar lower pinion attached to the shaft of the roller F', forked segment $O^2$, segment-case $F^2$, loosely attached to shaft H, ratchet-wheel $Z^3$, firmly attached to shaft H, and cam having the wrist-pin $O^3$, firmly attached to the drive-shaft $A^3$. As the drive-shaft $A^3$ rotates the wrist-pin $O^3$ engages with the alternate inner sides of the forks of the segment $O^2$, causing it to oscillate on the pivot $O^4$, which causes the segment-case $F^2$ to oscillate in like manner by means of their toothed connection. Within the case $F^2$ is a pawl which engages with the teeth of the ratchet-wheel $Z^3$, causing said ratchet-wheel to rotate partially and intermittently, and with it the shaft to which it attaches, and also the feed-rollers. At each such partial rotation of the feed-rollers a sufficient quantity of wire is fed in to make a barb. I make no claim for this feed, as any feed that will intermittently feed in the barb-wire will answer the purpose as well. The feed feeds the barb-wire $w'$ into the machine intermittently as needed, and just long enough at each feed for a barb. After the barb-wire $w'$ leaves the feed it passes on and is grasped by a jaw or grasper, $c'$, (shown particularly in Figs. 6 and 7 detached from the machine,) and lies in said grasper-jaw and between the cutting-off dies $n$ and $n'$, where it is cut off diagonally, as is shown in Fig. 6, until it is formed into the shape of a staple having a long body, as shown in Fig. 1 at $b$, and then carried forward by said jaw $c'$ and delivered into the strand-wires, so that each leg or prod of the barb enters between the two strand-wires $w$, a prod on either side of the cross, as shown in Figs. 1, 2, and 3, after which the wrapper $t$ of the wrapping-pinions P and P' catch each leg or prod of the barb and wrap it in the form shown in Fig. 2.

The manner in which the barb is formed and fed into the strand-wires is as follows: After the barb-wire $w'$ has been fed into the machine and a portion of its end long enough for a barb has been grasped by the grasper $c'$, the cutting-off die $n'$, which is fastened into the pendulum-block $D^2$, is caused to swing forward by means of its attachment to the arm $D^3$, which is pivoted at its upper end between the points $g$, Fig. 1, and is operated by the cam K, Fig. 9, swings forward and cuts off the barb-wire diagonally between the dies $n$ and $n'$. The location of said dies $n$ and $n'$ is shown more clearly in Figs. 3, 6, and 9. The grasping-jaw $c'$ is located in the machine, so that its part that grasps the barb stands at the foot and immediately under the pendulum-block $D^2$ on the arm T, (shown in Figs. 3 and 7,) and between a pair of bending rods or dies, $h\,h$, that are also attached to said pendulum-block $D^2$, and held firm by the plates $n^2$ and $n^3$, (shown in Fig. 3.) The barb-wire passes into and through said grasping-jaw $c'$ just in front of these bending-dies $h\,h$. The cam K swings the block $D^2$ forward far enough to cut off the barb, as before stated, and far enough so that the two bending-dies $h$, in their movement forward, strike against each leg or prod of the barb and carry them forward far enough to bend its legs or prods straight forward and at right angles with its body, in the form shown in Figs. 1 and 6 by the dotted lines. Fig. 6 shows more clearly the location of the barb both before and after it is formed, $c'$ representing the jaw holding the barb, $n'$ representing a section of the upper die attached to the pendulum-block $D^2$, $n$ being a plan view on the top of the lower die, (shown also in Figs. 3 and 9,) $h$ representing the bending-dies attached to the same pendulum-block, $D^2$. The dotted lines show the position of the cutting-off dies $n'$ and the bending-dies $h$ after the pendulum-block has swung forward with the cutting-off die $n'$ and the bending-dies $h$ and cut-off and bent the barb, as shown in said Fig. 6. While this operation of cutting off and bending the barb is being performed the cam-wheel K', which operates the jaw $c'$ to move it forward, has permitted said jaw to remain stationary; but said cam K', is so set on the shaft L with relation to cam K that the instant cam K has moved the dies to cut and form the barb cam K' has then rotated far enough to move the jaw $c'$ forward, as shown by the dotted lines in Fig. 7, carrying the barb forward firm in its grasp until it has driven each leg or prod of the barb between the strand-wires immediately over the place where they cross each other, as shown in Figs. 1, 3, 7, and 11, which grasp is not released until the wrappers $t\,t$ of the wrapping-pinions P and P' have begun to wrap the prods on the strand-wires, when the jaw $c'$ opens and returns to perform another like operation. The grasping-jaw $c'$ is caused to prolong its grasp on the barb by reason of the upper half of the jaw being attached by the link $i'$ to the bent arm $i$, which has its inner end pivoted to the side of the vibrating arm T with the arm $m$, while its outer end rides on the shaft L on the cam $J^2$. (Shown in Figs. 7 and 8.) As the arm T is being carried forward the bent end of the arm $i$ will ride on said cam $J^2$ in such manner that it will continue the grasp of the jaw $c'$ on the barb until it has been delivered into the strand-wires, when such grasp will be released on account of the cam $J^2$ having rotated far enough to lower the arm $i$ down onto the shaft L. The arm $m$ forks over the the shaft L, on which it rides, and connects the arm T with cam K' by means of a wrist-pin and friction-roller to run in the cam-channel of the cam K', as shown in Fig. 7. Before the fingers $e^2$ and $e^3$ cross the wires $w\,w$ the finger $c^2$ is driven in between the strand-wires next the wrapping-pinion P', to hold the wires apart, and so they can be crossed by the fingers $e^2$ and $e^3$, and remains there until the barb has been delivered between the wires, when it is immediately removed. This finger $c^2$ is operated by the cranks $d^2$ and $d^3$ by means of the wrist-pin $d'$ on the cam $p$, attached to the side of cam K', as shown in Fig. 1. Were it not for the finger $c^2$ being thrust in between the strand-wires, as stated, and as shown in Fig. 11, they could not be crossed and held in that position until the barb is delivered into the strand-wires. Immediately upon the barb being delivered into the strand-wires, as aforesaid, its points or prods must be wrapped on the strand-wires to hold it on and prevent the strand-wires from separating. This is accomplished by means of the wrappers $t\,t$ on the wrapping-pinions P and P'. The construction of the wrapping-pinions is shown in Figs. 4 and 5, and consists of a hollow shaft, $c^6$, having integral cogs around its central circumference, and rotating in the boxes D and D' by means of the segmental racks R and R'. (Shown in Fig. 4.) The motion of the racks R and R' is reciprocating in opposite directions from each other, so as to give a corresponding motion to the wrapping-pinions P and P', and is derived from the eccentric cam $K^2$ on the shaft L by means of the connecting-rods $a'\,a^4\,a^5$ and cranks $a\,a^2\,a^3$ on the rocking shaft B', as shown in Figs. 3 and 4.

The part of the wrapping-pinions that wrap the barb upon the strand-wires consists of the wrappers $t\,t$ (shown in Fig. 5) on the outer end of an extension of the pinion proper. When the barb has been delivered into the strand-wires, where they are crossed, and in the position shown in Figs. 5 and 11, a forward rotation of the wrapping-pinions causes the wrappers $t\,t$ on each pinion to rotate against the prods of the barb, carrying them around in opposite directions and wrapping them on the strand-wires until they are in the form and position shown in Fig. 2, when the wrapping-pinions reverse their motion by means of the return of the racks R and R' to their original position, ready to perform another like operation. Should the prods of the barbs spread apart after being delivered into the strand-wires, they are gathered up by the gatherers $y'\,y'$, the inclined faces of which bend them back to a line at right angles with the strand-wires. The instant the barb is thus formed the strand-wires are drawn on through the machine far enough so the next succeeding barb can be placed on in like manner as the preceding one. This is accomplished by means of the take-up shown in Fig. 2. This take-up consists of a pair of spring-dogs, $s^6\,s^6$, pivoted to the top of the sliding plate S, which reciprocates back and forth by means of the vibrating arm $s^4$ on the rock-shaft $x$, which receives its motion from the cam $s^2$ on shaft L. The reciprocation of the spring-dogs $s^6\,s^6$, by means of which the strand-wires are grasped and drawn from the barbing-machine, carries it on into the part of the machine called the "twister," $T^3$, which, being no part of this invention, is not further illustrated or described. The strand-wires pass between a pair of plates, $r\,r$, which serve to retain one strand-wire over the other and prevent their twisting until after they leave said plates, to prevent the dogs $s^6\,s^6$ from injuring the prods of the barbs as they slide along on either side of the strands back and forth to grasp them and draw them through, as stated. When the barb $b$ is driven in between the two strand-wires, it might drive its points against the strand-wires, and thus press them out of line between the wrapping-pinions P P'. In order to prevent this, a post, $c$, (shown in Figs. 1 and 3,) stands near the strand-wires, on the opposite side from the side the barb is fed in, and so that when the barb is driven in its prods will stride the said post $c$, the said post forming a back against which the strand-wires rest to hold them in position while the barb is being so placed in them.

In Fig. 12 the lower die, $T^4$, of the barb-grasper or jaw $c'$ is shown as being adjustable up or down by means of a set-screw, $T^6$, at its lower end, so that when the upper end of said die wears it can be set up to grasp the barb firmly. The upper die-plate, $c^{10}$, of said jaw $c'$ is made so it is removable, and is held in place by a screw passing through it, as shown, and having a tail-piece to extend into the jaw $c'$, as shown in Fig. 13, so it will not move laterally, and is removable, so when worn it can be replaced by a new one. The eyes in the ends of the fingers $e^2$ and $e^3$, through which the strand-wires $w\,w$ pass, are provided with removable friction-plates $e^{10}$, as shown in Fig. 14, and held in position by the pin $e^7$, passing through the end of the finger and through a groove in the side of the said friction-plates. These friction-plates are removable, so they may be replaced by new ones when worn out.

In order to regulate the grasp of the barb-grasper on the barb, the arm $i'$, Fig. 12, is pivoted to the side of arm $i$, at its lower end, on an eccentric sleeve, $i^8$, on the wrist-pin $i^7$, which passes through it. By rotating said eccentric sleeve $i^8$ it is obvious the jaw $c'$ will grasp the barb more or less firmly, as desired.

Having thus described my invention, what I claim as new, and desire to secure by Letters Patent, is as follows, to wit:

1. In a wire-barbing machine, the combination of the shaft L, cams K' and $J^2$, arms $i$ and $m$, jaw $c'$, cutting-off dies $n$ and $n'$, bending-dies $h\,h$, pendulum-block $D^2$, arm $D^3$, and cam K, all adapted to operate as and for the purpose set forth.

2. In the machine described for making barbed wire, the combination of a suitable jaw or grasper for grasping and holding the barb, with the cam K, arm $D^3$, pendulum-block $D^2$, having the bending-dies $h\,h$, and cutting-off die $n'$, to swing therewith, and stationary lower cutting-off die, $n$, all adapted to operate as and for the purpose set forth.

3. In a wire-barbing machine, the combination of the wire-crossing fingers $e^2$ and $e^3$ and cams $e$ and $e'$, adapted to operate as set forth.

4. In a wire-barbing machine, the combination of the shaft L, rods $a'$, $a^4$, and $a^5$, cranks $a$, $a^2$, and $a^3$, shaft B′, eccentric cam $K^2$, reciprocating segmental racks R and R′, and wrapping-pinions P and P′, having the wrappers $t\ t$, and inclined gatherers $y'\ y'$, as and for the purpose set forth.

5. In a wire-barbing machine, the post $c$, adapted to support the strand-wires $w\ w$ while the barb $b$ is being placed on them, in combination with the jaw $c'$, arm T, lever $m$, and eccentric cam K′, as and for the purpose set forth.

6. In a wire-barbing machine, the combination of the cam $s^2$, shaft $x$, vibrating arm $s^4$, plate $s$, and spring-dogs $s^6\ s^6$, adapted to operate as and for the purpose set forth.

7. The combination of the arm T, grasper $c'$, lug $T^7$, set-screw $T^6$, and die $T^4$, as and for the purpose set forth.

8. The combination of the fingers $e^2$ and $e^3$, friction-plates $e^{10}\ e^{10}$, and pin $e^7$, as and for the purpose set forth.

9. The combination of the grasper $c'$, arms $i$ and $i'$, eccentric sleeve $i^8$, and adjustable die $T^4$, as and for the purpose set forth.

JOHN W. NADELHOFFER.

Witnesses:
 THOS. H. HUTCHINS,
 WM. J. HUTCHINS.